United States Patent [19]

Calcinai

[11] Patent Number: 4,813,140
[45] Date of Patent: Mar. 21, 1989

[54] LAWN AND BUSH CUTTER WITH REMOTE PAYOUT OF CUTTING WIRE

[76] Inventor: Maria R. Calcinai, Via del Molino No. 18 - Montanino, 50066 Reggello, Firenze, Italy

[21] Appl. No.: 57,343

[22] Filed: Jun. 3, 1987

[30] Foreign Application Priority Data

Jun. 13, 1986 [IT] Italy ................................. 9415 A/86

[51] Int. Cl.$^4$ .............................................. B26B 7/00
[52] U.S. Cl. ...................................... 30/276; 30/347
[58] Field of Search .................. 30/276, 347; 56/12.5, 56/12.7

[56] References Cited

U.S. PATENT DOCUMENTS 4,138,810  2/1979  Pittinger et al. ...................... 30/276

Primary Examiner—Douglas D. Watts
Attorney, Agent, or Firm—McClew & Tuttle

[57] ABSTRACT

A lawn and bush cutting device comprises a housing mounted for rotation about an axis with a drive shaft fixed to the housing and drivable by a motor for rotating the housing. A wire cylinder is coaxially mounted in the housing and can be held fixed with respect to the housing for rotation therewith. A supply of cutting wire is wound on the wire cylinder, or on a reel rotatably fixed to the wire cylinder. A length of the wire extends out of the housing to act as a cutting tool when the housing rotates. A sleeve member is axially movable in the housing and has helical coupling piece which are coupled to helical piece in the cylinder. Axial movement of the sleeve thus causes relative rotation between the wire cylinder and housing, thus paying out additional lengths of wire from the housing. A ring is axially moveable but rotationally fixed to the sleeve and can be moved downwardly by cable operated member. The ring has recesses which engage projections of the sleeve member so that, with the ring lowered, the sleeve member is engaged and can be forced further downwardly to cause relate rotation between the wire cylinder and the housing. The ring also includes teeth which engage the cylinder for holding the cylinder rotationally fixed with the shaft when the ring is disengaged from the sleeve member, and for disengagment from the cylinder when the ring is engaged with the sleeve member.

8 Claims, 2 Drawing Sheets

LAWN AND BUSH CUTTER WITH REMOTE PAYOUT OF CUTTING WIRE

FIELD AND BACKGROUND OF THE INVENTION

The present invention relates in general to grass and weed cutters of the type using a rotating cutting wire, and in particular to a new and useful lawn and bush cutting device which includes a remote control mechanism for paying out increments of the cutting wire after it has been lawned or sheared.

SUMMARY OF THE INVENTION

The invention relates particularly to a lawn, brush, bush and similar material cutter having a rotor carrying wires suitable for cutting the material by the rotation of the rotor. The wires are anchored to the rotor and project a portion of the wire therefrom, so that wire portions keep more or less radial. The wires are wound on a cylinder coaxial to the rotor. The cylinder is driven into rotation to wind up the wire or release a portion to restore the length of the portion which extends radially outwardly. According to the invention, the wire cylinder is coupled to a rotor through a sleeve member by a helical coupling with large pitch, and means are provided to cause an axial sliding of the sleeve, thus causing a rotation of the cylinder through a limited angle in respect to the rotor and a consequent unwinding of the wires.

The inventive device includes a gear coupling for the driving of the wire cylinder for rotation thereof with the rotor and for the disengagement therefrom through the axial sliding of the driving member. This comprises a sleeve; a ring suitable for pushing the sleeve for its disengagement and means to prevent the rotation of the sleeve and a ring for pushing the sleeve, axially while the rotation thereof is prevented, after the disengagement has taken place and in order to act with the large pitch helical coupling a spring is provided for the return of the various members to the starting position, upon disengagement.

A ring that can be controlled from the outside by a connecting cable or the like is able to make the ring slide together with the ring acting on the teeth coupling and the sleeve of the helical coupling.

The device includes a hood, that is mounted through a bearing on the rotating drum and is prevented from rotation and the hood partially covers the rotating parts.

Accordingly a further object of the present invention is to provide a lawn or bush cutting devices which comprises a housing mounted for rotation about an axis, a drive shaft fixed to the housing and drivable for rotation about the axis for rotating the housing, a wire cylinder axially mounted in the housing for carrying a supply of wire with a portion of the wire extendable outside of the housing for acting as a cutting member for rotation of the housing, a sleeve member mounted for axial movement in the housing and having a helical coupling engaged with the wire cylinder for rotating the wire cylindar with respect to the housing when the sleeve member is moved axially in the housing, and axial motion means operatively connected to the sleeve member for moving the sleeve member axially to rotate the wire cylinder with respect to the housing for changing the length of wire extending from the housing.

A further object of the present invention is to provide a lawn and brush cutting device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
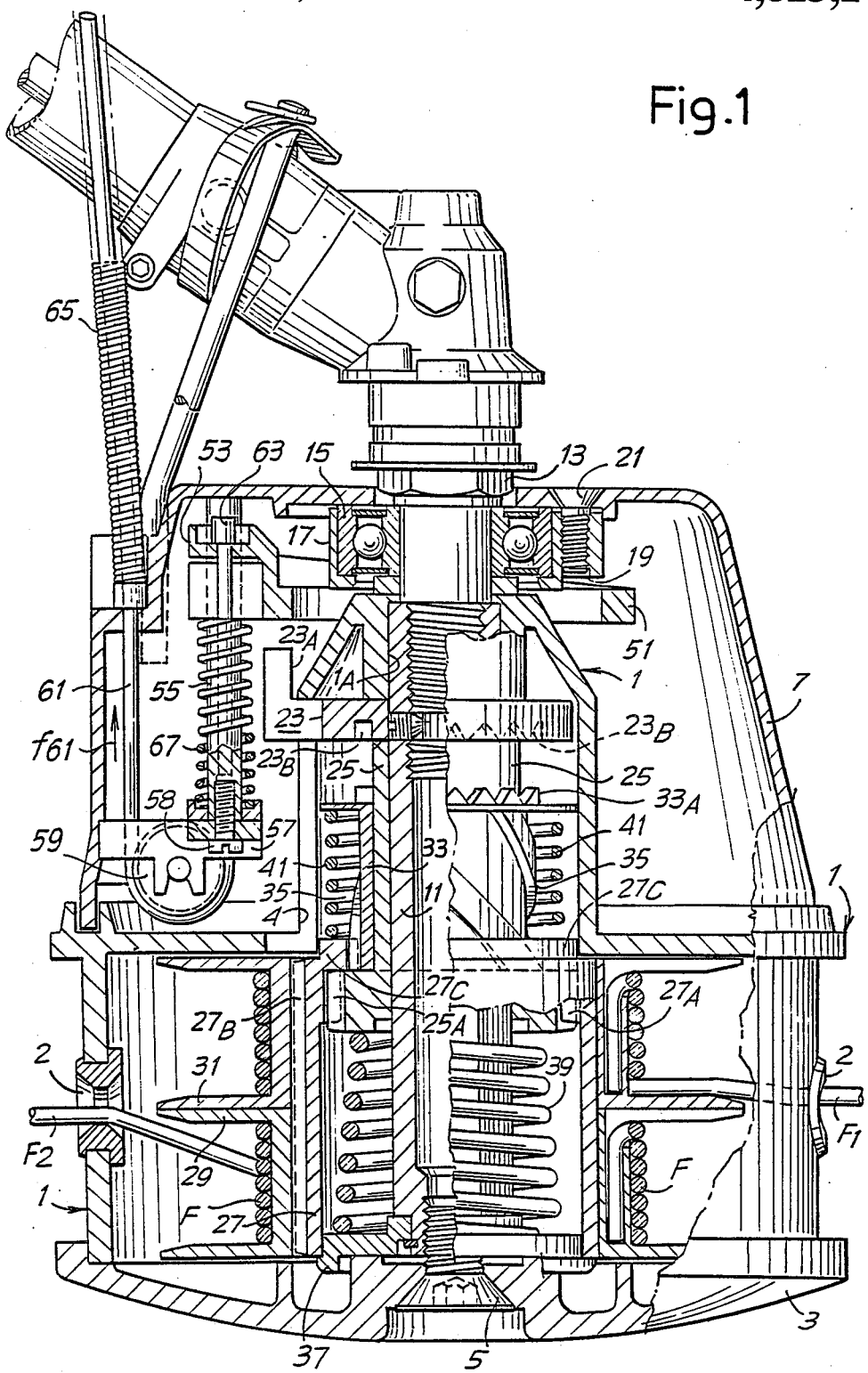
FIG. 1 is an axial sectional view of the lawn and bush cutting device in accordance with the present invention.
Figure 2:
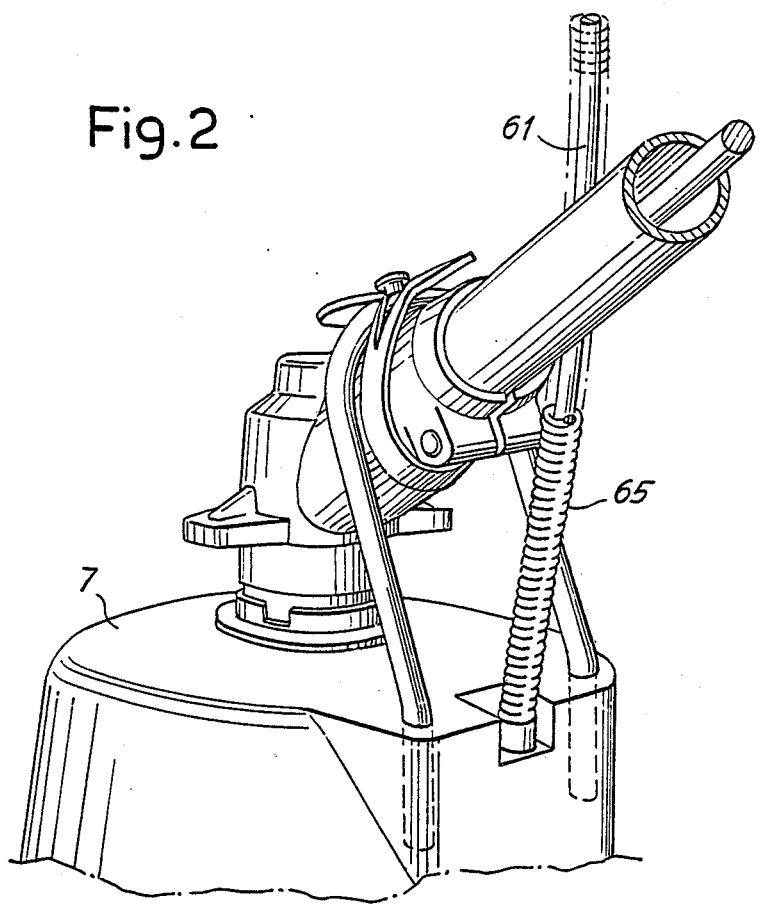
FIG. 2 is a perspective view of the top portion of the device shown in FIG. 1.

Referring to the drawings, the garden material cutting device includes an axially symmetrical drum or rotating closed housing generally designated 1 which is closed at its lower end by a bottom cover 3 fastened by a central screw 5 to the housing 1. The upper end of the housing 1 is closed by a hood 7 which is prevented from rotating with respect to a maneuvering rod or ladder of the device. The hood 7 covers the top of the housing 1 and prevents weeds and long grass from winding on the drum. A hollow shaft 11 with a prismatic external surface—mostly a hexagonal surface—is located in the housing 1. An end portion of the interior of the hollow shaft 11 is threaded into and locked to the housing 1. For the locking of the cover 3, the screw 5 is engaged to a first threaded cover end of shaft 11. A bolt 13 is inserted into the hollow shaft 11 from its upper end, and secures the inner race of a bearing 15 to the hollow shaft 11 and housing 1. An external race or ring of the bearing 15 is, in turn, housed in a bushing 17 provided with holes 19 threaded for screws 21 for its connection to the hood 7. The relative rotation between the housing 1 and the shaft 11 is prevented by the engagement provided by external prismatic surfaces of the shaft 11 which are engaged on a prismatic seat 1A defined on the upper part of the housing 1.

The following elements are mounted for sliding on hollow shaft 11: a ring 23 provided with right angular appendixes 23A which project out of housing 1 and into hood 7, through clefts 4 of the housing 1; and a sleeve 25 which is provided with teeth 25A for its coupling with a channeled profile. Both the ring 23 and the sleeve 25 can slide axially on the shaft 11, but they cannot rotate with respect to it because of the prismatic configuration of the shaft 11 and the presence of a hole which passes through the ring 23 and the sleeve 25.

The teeth 25A of the sleeve 25 are coupled with homologous teeth 27A of a hollow cylinder 27 to form a tooth or gear coupling with a channeled profile. The external surface of the cylinder 27 has teeth 27B whereon homologous teeth are engaged of two or more reels or coils 29 and 31. Wire or lines F1 and F2, made of "Nylon" or eviquivalent, are wound on reels 31 and 29, to form the cutting member of the cutting device. The end portions of the wires F1, F2 extend outside the housing 1 through holes 2 provided in the housing 1.

The end portions of the wires F1 and F2 define the cutting area which wears away or is sheared. These end portions must be periodically restored in their length.

A further sleeve 33 is coaxially inserted on the sleeve 25, so that it can rotate thereon. Sleeve member 33 has exterior helical teeth or surfaces 35 with a large pitch, that is, a rapid pitch which is engaged on a corresponding toothed helical internal crown made on an internal collar 27C of the hollow cylinder 27. On its upper area the sleeve member 33 has a crown of projections 33A with triangular profile or analogous, which can engage in corresponding seats 23B made on the lower base of the ring 23.

A small shaped disc 37 having a hole therethrough, is fastened on the shaft 11 by an elastic ring, circular clip or the like. Disc 37 holds the hollow cylinder 27 in position (and thus the reels 29,31) and forms the support for a spring 39, which is based upwardly against the sleeve 25. A further spring 41, reacting on the collar 27C of the hollow cylinder 27, pushes upwardly against the sleeve member 33.

Coaxially with the drum there is a ring 51 which is mounted inside the hood 7. The ring 51 is equipped with an appendix 53 having sliding profiles that slide on prismatic guides 55 that are fixed solid to the hood 7. Two guides, one behind the other in FIG. 1, are provided. Thus, the guides center the ring 51 and guide the up and down sliding thereof with respect to the hood 7.

A support 57 is fastened to the guides 55 by screws 58 and acts as a support for a transmission pulley 59 entraining a thin cable 61. The cable 61 is anchored at its one end 63 to the appendix 53 of the ring 51, and extends upwardly from the hood 7 into a sheath 65. The other end of the cable 61 is connected to a lever (not shown) connected to a support rod of the lawn cutter. The ring 51 is pushed upwardly by a spring 67, that reacts on the support 57 and produces a contrasting action to the tension of the cable 61.

During normal working conditions, the hollow shaft 11, which is driven to rotate by the transmission of the device motor (not shown), drives the housing 1 for rotation. The ring 23 and the sleeve 25 also rotate, through their coupling to the corresponding prismatic surfaces of the shaft 11 and the members 1, 23, 25. The sleeve 25 in turn transmits its rotational motion to the reels 29 and 31 through its teeth 25A, the teeth 27A, the hollow toothed cylinder 27 and the teeth 25B. Thus, during normal working conditions the housing 1 and all the members housed therein are rotated by the shaft 11.

The invention allows for the length adjustment of the external portions of the wires F1, F2, that form the cutting member of the device, inorder to adapt these lengths to the characteristics of the vegetation to be cut and/or to remedy the situation if the wires break. This is done without stopping the cutting device by simply temporarily stopping the rotation of the drum by disengaging it from drive clutch (not shown).

The release of an increment of the length of wires F1 and F2 takes place as follows: After the drive clutch has been disengaged, and the rotation of the drum including the housing 1 has been stopped, the cable 61 is pulled toward the outside of the hood 7, that is in the direction f61, thereby the ring 51 is moved downwardly. This acts on the appendixes 23A of the ring 23, that is pushed downwardly also. Along the first portion of its stroke, the ring 23 pushes the sleeve 25 downwardly, up to the point of disengagement of the teeth 25A of the sleeve 25, from the teeth 27A of the cylinder 27. Cylinder 27 can thus now freely rotate with respect to the shaft 11.

Along the further portion of the downward stroke of ring 23, the ring engages the sleeve member 33 through the seats 23B and projections 33A of the same sleeve member 33. In this way, along the further downward stroke of the ring 23, the rotation of the sleeve member 33 is prevented, the rotation of the ring 23 being in turn impossible because of the appendixes 23A sliding in the clefts 4 of the housing 1. The axial movement downwardly of the sleeve member 33, because of the helical teeth 35 with large, that is, rapid pitch, engaged with the collar 27C of cylinder 27, causes an angular movement or rotation of the same cylinder 27 and of reels 29 and 31 engaged to said cylinder 27. As a consequence, an unwinding of the wires F1 and F2 from these reels is obtained.

After the unwinding of wires F1 and F2, the sleeve 25 and the sleeve member 33 are brought again to their position for normal working by the action of the springs 39 and 41 respectively, as soon as the cable 61 is loosened. The sleeve 25 in turn carries back the ring 23 to its normal position, while the ring 51 is carried back to its normal upper position by the spring 67. Repeated pulling of the cable 61 allows for a greater unwinding of wires. By engaging the clutch the operation starts again. Cable 61 thus activates axial motion means for axially moving sleeve member 33 to rotate cylinder 27 in its housing 1.

While a specific embodiment of the invention has been shown and described in detail to illustrate the application of the principles of the invention, it will be understood that the invention may be embodied otherwise without departing from such principles.

What is claimed is:

1. A lawn and bush cutting device, comprising a housing(1) for rotation about an axis, a drive shaft (11) fixed to said housing and drivable for rotation about said axis to rotate said housing, a wire cylinder (27) coaxially mounted with respect to said drive shaft in said housing, said wire cylinder being adapted for carrying a supply of wound cutting wire having a cutting portion extending from said housing, a sleeve member (33) mounted for axial movement in said housing and having a helical coupling coupled with said cylinder for causing relative rotation between said cylinder and said housing with axial movement of said sleeve member, and axial motion means operatively connected to said sleeve member for moving said sleeve member axially to rotate said cylinder with respect to said housing for changing the length of the cutting portions extending out of said housing.

2. A device according to claim 1 wherein said axially motion means comprises a sleeve (25) mounted for co-rotation and for axial movement relative to said shaft (11), said sleeve and said cylinder having first piece (25A, 27A) engageable with each other in a first axial position of said sleeve for corotation of said shaft, sleeve and cylinder, a ring (23) corotationally and axially mounted to said shaft and engaged with said sleeve for axial movement therewith on said shaft, said ring and said sleeve member (33) having second teeth (23B, 33A) engageable with each other at a second axial position of said ring for corotation of said ring and said sleeve member, said second axial position of said ring corresponding to a second axial position of said sleeve wherein said first teeth are disengaged from each other for free relative rotation between said ring and said sleeve, and spring means biasing said sleeve into its first axial position whereby axial movement of said ring into its second position closes axial movement of said sleeve into its second position to engage said second teeth and disengage first teeth with continued axial movement of said ring causing relative axial movement between said sleeve member and said cylinder to cause relative rotation between said cylinder and said housing.

3. A device according to claim 2 including a maneuvering ring (51) mounted for axial movement with respect to said shaft (11), said first mentioned ring (23) including a portion engageable with said maneuvering ring with axial movement with said maneuvering ring for moving said first mentioned ring axially into its second position.

4. A device according to claim 3 including a fixed hood (7), a bearing (15) connected to said hood, said shaft being rotatably mounted to said bearing and said housing being rotatably mounted to said hood, said maneuvering ring (51) being mounted for axial movement to said hood.

5. A device according to claim 4 including a cable extending out of said hood and connected to said maneuvering ring for moving said maneuvering ring axially in said hood.

6. A device according to claim 1 including a hood (7) having a bearing (15), said hollow shaft extending axially in said hood and being connected to said bearing for rotation on said bearing, said housing being mounted for rotation to said hood, said axial motion means comprising a pushing ring mounted for corotation and for axial movement to said shaft, a maneuvering ring mounted for axial movement in said hood and engageable with said pushing ring for moving said pushing ring axially on said shaft, a coupling sleeve mounted for corotation and for axial movement relative to said shaft, said pushing ring being engaged by said coupling sleeve for moving said coupling sleeve axially with axial movement of said pushing ring, said cylinder and said coupling sleeve having first teeth engaged with each other in a first position of said coupling sleeve for corotation of said coupling sleeve and said cylinder, said pushing ring being moveable to a second axial position for disengaging said first teeth to permit relative rotation between said coupling sleeve and said cylinder, said pushing ring and said sleeve member having second teeth engageable with each other with said pushing ring in its second position for corotation of said pushing ring and said sleeve member and for moving said sleeve member axially to cause relative rotation between said cylinder and said housing for unwinding wire to change the length of the cutting portion extending out of said housing.

7. A device according to claim 6 including a guide extending parallel to the axial direction of said shaft and fixed to said hood, said maneuvering ring being mounted for axial sliding on said guide, a cable extending into said hood and along said guide and connected to said maneuvering ring, said cable being pullable to move said maneuvering ring axially on said guide.

8. A device according to claim 7 including a first spring for biasing said coupling sleeve into a first position with said pushing ring, a second spring engaged with said sleeve member for biasing said sleeve member into a first position toward said pushing ring, and a third spring engaged with said maneuvering ring for biasing said maneuvering ring away from said pushing ring.

* * * * *